UNITED STATES PATENT OFFICE.

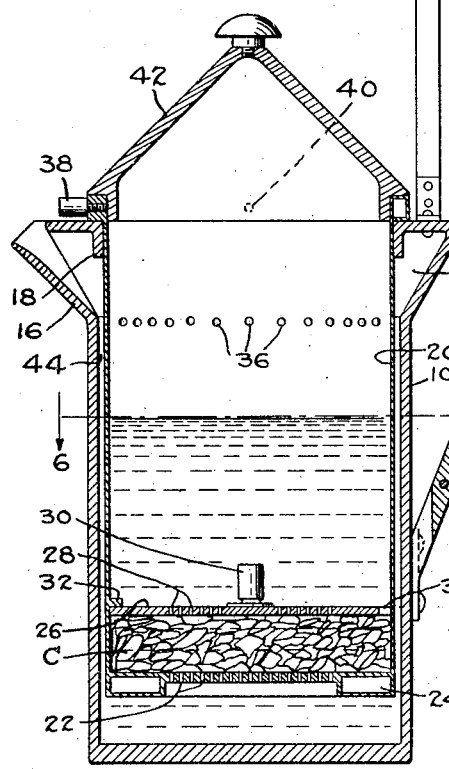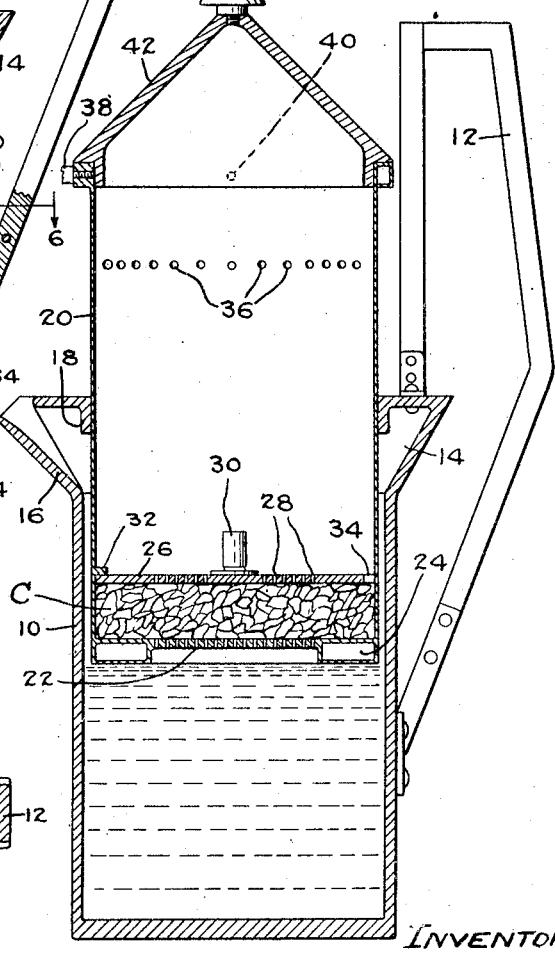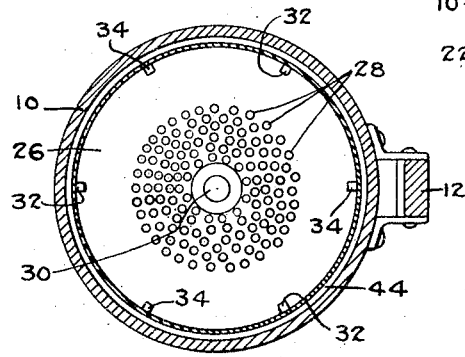

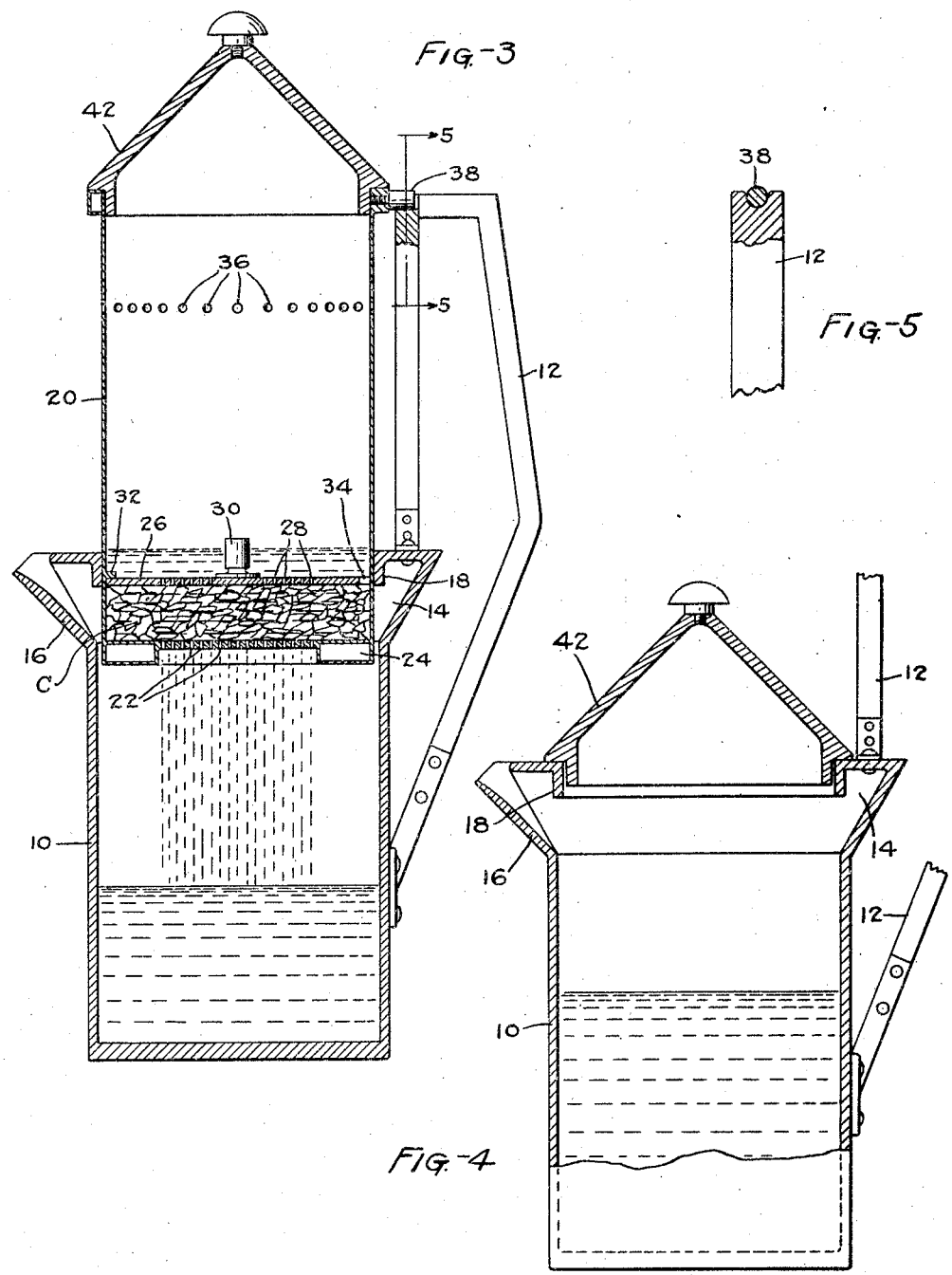

EDWARD SPRAGUE, JR., OF OAK PARK, ILLINOIS.

COFFEE-MAKING DEVICE.

1,362,644.   Specification of Letters Patent.   Patented Dec. 21, 1920.

Application filed March 12, 1920. Serial No. 365,185.

*To all whom it may concern:*

Be it known that I, EDWARD SPRAGUE, Junior, a citizen of the United States, residing at Oak Park, in the county of Cook and State of Illinois, have invented certain new and useful Improvements in Coffee-Making Devices, of which the following is a specification.

My invention relates to coffee-making devices and an object is to provide a construction whereby the flavor of crushed or broken coffee beans may be extracted conveniently, expeditiously and economically. It has been found that when coffee beans are pulverized in grinders, the gears of the machine become heated, with the result that considerable strength and aroma of the coffee are lost. Not only is this the case, but pulverized or finely ground coffees lose their strength when allowed to stand in the house or on store shelves. An object therefore of my invention is to provide a device which will effectively extract the full strength of broken or coarsely crushed coffee beans. Another object is to provide a device of this kind all the parts of which are readily accessible for cleaning and which has no parts liable to become clogged.

The full objects and advantages of my invention will appear in connection with the detailed description thereof and the novel features embodied in my inventive idea will be particularly pointed out in the claims.

In the drawings, which illustrate the application of my invention in one form,—

Figure 1 is a vertical sectional view of the device in position for starting the boiling operation. Fig. 2 is a vertical sectional view of the device with the parts in the position which they assume when the boiling is about completed. Fig. 3 is a vertical sectional view of the device in draining position. Fig. 4 is a vertical sectional view of the device in pouring position. Fig. 5 is a sectional detail view on the line 5—5 of Fig. 3. Fig. 6 is a view in horizontal section on the line 6—6 of Fig. 2.

Referring to the particular construction shown in the drawings, the numeral 10 designates a receptacle which is provided with a suitable handle 12. The receptacle is provided with an outwardly-flared portion which forms an annular chamber 14 from one side of which extends a pouring lip or spout 16. The upper wall of the chamber 14 at the inner margin is turned downwardly to form a flange 18. This flange constitutes a guide for a submerger, which consists of a body portion 20 having a bottom the central portion of which is provided with a multiplicity of perforations 22 to form a screen and the marginal portion of which consists of a hollow float 24 in annular form. As is evident from the drawings, the submerger is intended to receive the crushed or broken coffee beans C, and in order to retain the latter near the bottom of the submerger I provide a weight or plate 26 having a multiplicity of screen perforations 28 and a handle 30. In order that the plate 26 may be held in place over the material for making the coffee, I prefer to provide a number of lugs 32 on the body portion of the submerger and a corresponding number of holes 34 in the margin of the plate 26 so that by turning the latter it may be prevented from being forced upwardly by the boiling water. The crushed coffee is thus retained in a small space, where it is subjected to the action of the boiling water without any considerable amount of agitation thereof. The body 20 of the submerger toward the upper portion thereof is provided with a circular row of holes 36 for a purpose which will presently appear. The top of the submerger is provided with a projection 38 which may be placed in a notch in the top of the handle 12 as shown in Figs. 3 and 5 to retain the submerger in elevated position over the receptacle. The top of the submerger may be provided with other projections 40 to constitute handles by which it may be readily lifted. A cover 42 is adapted to fit the top of the submerger, and upon removal of the submerger from the receptacle it may be used as a cover for the receptacle, in which case it fits the circular flange 18. This flange is of slightly less diameter than the body of the receptacle 10 and hence when the submerger is in the position shown in Fig. 2 an annular passage-way or by-pass 44 extends from the bottom of the receptacle up to the annular chamber 14.

The operation and advantages of my invention will be readily understood in connection with the foregoing description. The desired quantity of water is placed in the receptacle 10, the broken coffee is placed in the bottom of the submerger and the plate 26 is placed on top of the broken coffee. The submerger is then placed in the receptacle and the float on the bottom of the submerger at first prevents the latter from sinking in the water, so that it is retained in the position shown in Fig. 1. Upon placing the device upon the stove or applying heat in any other suitable manner, the boiling water bubbles up through the perforations 22 and 28 and through the crushed coffee, with the result that the liquid which is discharged within the body of the submerger weights the same so that it descends slowly and evenly to the position shown in Fig. 2. The by-pass 44 around the submerger takes care of the overflow when the submerger is down and any liquid passing up this by-pass goes into the annular chamber 14, from which it passes through the holes 36 into the submerger. Overflow outside of the receptacle is thus prevented. When the submerger reaches the bottom of the receptacle the beverage is practically completed, and this is indicated both by the position of the submerger and by the difference in the sound produced by the boiling water. In case very strong coffee is desired the boiling may be continued a little longer. The device is then removed from the action of the heating medium and the submerger is raised and held by the projection 38, the submerger being turned so that the projection 38 rests within a notch at the top of the handle whereby the submerger is retained in the position shown in Fig. 3, thus allowing the liquid to drain down into the receptacle 10. The submerger carrying the useless grounds is then removed for cleaning. The cover 42 upon being removed from the submerger is placed on the receptacle as shown in Fig. 4, whereupon the receptacle may be used in the manner of a pitcher for pouring out the beverage. In the use of my device the boiling water comes immediately into contact with the broken coffee and a vortex action is produced which draws all of the flavor out of the coffee beans so that a less quantity of the latter is required. At the same time, on account of the quick extraction of the flavor of the coffee, tannic acid and caffein are left behind in the grounds. All of the parts of the device may be taken apart in such manner as to permit of thorough cleaning, there being no tubes to become clogged. While the device is intended particularly for making coffee, it can be used for extracting the desirable qualities of other material such as grapes or other fruits.

I claim:

1. A coffee-making device comprising a receptacle in which water may be boiled, a submerger adapted to rest upon the water in said receptacle, and means whereby said submerger is caused to automatically and gradually sink as the water boils.

2. A coffee making device comprising a receptacle, a submerger adapted to operate in said receptacle, said submerger having a perforated bottom, means for guiding said submerger for vertical movement in said receptacle, and means which at first maintains said submerger upon water placed in said receptacle and permits the submerger to automatically and gradually sink as the water boils.

3. A coffee making device comprising a receptacle, and a submerger adapted to operate in said receptacle, said submerger having a perforated bottom and an attached float, said receptacle being enlarged at its upper end to provide a chamber, the wall of said submerger being perforated at a place which comes opposite said chamber when the submerger is in lowered position, and a by-pass extending from the lower portion of said receptacle to said chamber.

4. A coffee making device comprising a receptacle and a submerger adapted to operate in said receptacle, said submerger having a perforated bottom and an attached float, said receptacle being outwardly flared at its upper end to provide an annular chamber, said submerger having a plurality of holes which come opposite said annular chamber when the submerger is in lowered position, said submerger being somewhat smaller than said receptacle to provide a by-pass extending from the lower portion of said receptacle to said annular chamber.

5. A coffee-making device comprising a receptacle, a submerger adapted to operate in said receptacle, said submerger having a perforated bottom surrounded by a float, and a perforated plate adapted to be placed upon material contained in said submerger, said receptacle being outwardly flared at its upper end to provide an annular chamber, said submerger having a plurality of holes which come opposite said annular chamber when the submerger is in lowered position and said submerger being somewhat smaller than said receptacle to provide a by-pass extending from the lower portion of said receptacle to said annular chamber.

6. A coffee-making device comprising a receptacle, a submerger adapted to operate in said receptacle, said submerger having a perforated bottom surrounded by a float, a perforated plate adapted to be held upon material placed in said submerger, said receptacle being outwardly flared at its upper end to provide an annular chamber, said submerger having a plurality of holes which come opposite said annular chamber when the submerger is in lowered position in said receptacle and said submerger being somewhat smaller than said receptacle to provide a by-pass extending from the lower portion of said receptacle to said annular chamber, an upwardly-extending handle for said receptacle, a projection on the upper end of said submerger adapted to rest upon said handle, and a cover adapted to be placed either upon said submerger or upon said receptacle.

In testimony whereof I hereunto affix my signature.

EDWARD SPRAGUE, Jr.